United States Patent
Tsirkin (10) Patent No.: US 10,129,148 B2
(45) Date of Patent: Nov. 13, 2018

(54) TABLE-BASED LOAD BALANCING FOR BONDED NETWORK INTERFACES

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

(*) Notice: Subject to any disclaimer, the term of this patent is extended or adjusted under 35 U.S.C. 154(b) by 276 days.

(21) Appl. No.: 14/462,137

(22) Filed: Aug. 18, 2014

(65) Prior Publication Data

US 2016/0050145 A1    Feb. 18, 2016

(51) Int. Cl.
| | |
|---|---|
| H04L 12/741 | (2013.01) |
| G06F 9/50 | (2006.01) |
| H04L 12/861 | (2013.01) |
| H04L 29/08 | (2006.01) |
| H04L 12/803 | (2013.01) |
| G06F 9/455 | (2018.01) |

(52) U.S. Cl.
CPC ........ *H04L 45/745* (2013.01); *G06F 9/45558* (2013.01); *H04L 47/125* (2013.01); *H04L 49/9068* (2013.01); *H04L 67/1008* (2013.01); *G06F 2009/45595* (2013.01)

(58) Field of Classification Search
CPC . H04L 45/745; H04L 47/125; H04L 67/1008; H04L 49/9068; H04L 67/2833; H04L 29/06095; G06F 9/45558; G06F 2009/45595; G06F 9/00; G06F 17/30
See application file for complete search history.

(56) References Cited

U.S. PATENT DOCUMENTS

| | | | |
|---|---|---|---|
| 6,023,563 A * | 2/2000 | Shani | H04L 12/4625 370/401 |
| 6,665,733 B1 | 12/2003 | Witkowski et al. | |
| 7,333,485 B2 | 2/2008 | Witkowski et al. | |
| 8,031,632 B2 | 10/2011 | McGee et al. | |
| 8,130,644 B2 | 3/2012 | Tanaka et al. | |
| 8,705,580 B2 | 4/2014 | Raman | |
| 8,761,187 B2 | 6/2014 | Barde | |
| 8,788,647 B1 * | 7/2014 | Nolle | G06F 11/00 370/230 |
| 2004/0068589 A1 * | 4/2004 | Witkowski | H04L 12/467 709/249 |

(Continued)

OTHER PUBLICATIONS

"LACP Bonding in XenServer—configuration and Troubleshooting", Citrix.com, CTX135690, Jun. 26, 2014, pp. 1-9 http://support.citrix.com/article/CTX135690.

(Continued)

*Primary Examiner* — Chris Parry
*Assistant Examiner* — Soe M Hlaing
(74) *Attorney, Agent, or Firm* — Lowenstein Sandler LLP (57) ABSTRACT

Systems and methods for table-based load balancing implemented by bonded network interfaces. An example method may comprise: receiving, by a bonded interface of a computer system, a data link layer frame; identifying a network interface controller (NIC) of the bonded interface associated, by a load balancing table, with a source Media Access Control (MAC) address of the data link layer frame, wherein the load balancing table comprises a plurality of load balancing entries, each load balancing entry mapping a source MAC address to an identifier of a NIC comprised by the bonded interface; and transmitting the data link layer frame via the identified NIC.

17 Claims, 5 Drawing Sheets

(56) References Cited

U.S. PATENT DOCUMENTS

2010/0131636 A1* 5/2010 Suri .................. H04L 45/00
709/224

OTHER PUBLICATIONS

"Link Aggregation", Wikipedia, 7 pages http://en.wikipedia.org/wiki/Link_aggregation (Last modified Aug. 13, 2014).
"Ovs-vsswitchd—Open vSwitch daemon", openvswitch.org, pp. 1-10 http://openvswitch.org/cgi-bin/ovsman.cgi?page=vswitchd%2Fovs-vswitchd.8 (last accessed Jun. 26, 2014).
Silvano, Gai, "FCoE: Addressing", Nuova Systems, T11/07-547v1, Nov. 2007, pp. 1-28 ftp://147.145.44.154/t11/document.07/07-547v1.pdf.
Tsirkin, Michael, "Hash-Based Load Balancing for Bonded Network Interfaces", U.S. Appl. No. 14/462,157, filed Aug. 18, 2014.

* cited by examiner

TABLE-BASED LOAD BALANCING FOR BONDED NETWORK INTERFACES

TECHNICAL FIELD

The present disclosure is generally related to link aggregation, and is more specifically related to systems and methods for providing load balancing for bonded interfaces.

BACKGROUND

Link aggregation refers to various methods of combining multiple network connections in order to increase the overall throughput which might not be achieved by a single connection. Network interface controller (NIC) bonding refers to a method of aggregating multiple NICs into a single logical interface.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for table-based load balancing implemented by bonded network interfaces.

In the below description and examples, references are made to Open Systems Interconnection (OSI) model layers, including data link layer (layer 2) and network (layer 3), as defined by Recommendation X.200 (07/94) by International Telecommunications Union (ITU). A "frame" herein shall refer to a unit of transmission in a data link layer protocol, including a link-layer header followed by a data packet. The data link layer provides local delivery of frames between devices on the same local area network (LAN). Functions of data link layer protocols include local delivery, addressing, and media arbitration. Examples of data link protocols include Ethernet and Infiniband. The network layer provides the functional and procedural means of transferring variable-length data sequences from a source to a destination host via one or more networks, while maintaining the quality of service functions. Functions of network layer protocols include host addressing and message forwarding.

"Network interface controller" (NIC) herein refers to a computer hardware component that connects a computer to a computer network. A NIC may comprise electronic circuitry required to communicate with other networked devices using specific physical layer and data link layer standards.

Network interface controller bonding herein refers to a method of aggregating multiple NICs into a single logical interface that may be available to applications via a corresponding driver. Outgoing data link layer frames may be transmitted to an external recipient (e.g., a switch) via one of the NICs of the boded interface, referred to as "egress NIC." The egress NIC may be selected by a method that facilitates load balancing among the NICs participating in the bonded interface.

In certain implementations, the interface bonding technique may be employed in a virtualized environment, wherein a hypervisor may implement a data link layer bridge to aggregate traffic to/from two or more virtual NICs (vNICs) associated with one or more virtual machines. The bridged vNICs may communicate to two or more NICs of the host computer via a bonded interface that employs the table-based load balancing technique, as described in more details herein below.

In accordance with one or more aspects of the present disclosure, the selection of a NIC for outgoing frame transmission may be performed based on a load balancing table. Each table entry may map a source Media Access Control (MAC) address of an outgoing frame to an identifier of an egress NIC (i.e., the NIC that would transmit the outgoing frame to an external recipient).

Employing the load balancing table for identifying egress NICs for outgoing data link layer frames allows on-the-fly reconfiguration of the bonded interface, wherein such reconfiguration may comprise creating, deleting, and/or modifying one or more load balancing table entries. Reconfiguring the bonded interface may be useful for rebalancing the load onto the NICs of a bonded interface responsive to determining that the load of two or more NICs is not balanced, as well as for excluding a NIC from the bonded interface responsive to detecting an unrecoverable error condition associated with the NIC (e.g., a hardware fault).

Various aspects of the above referenced methods and systems are described in details herein below by way of examples, rather than by way of limitation.

Figure 1:
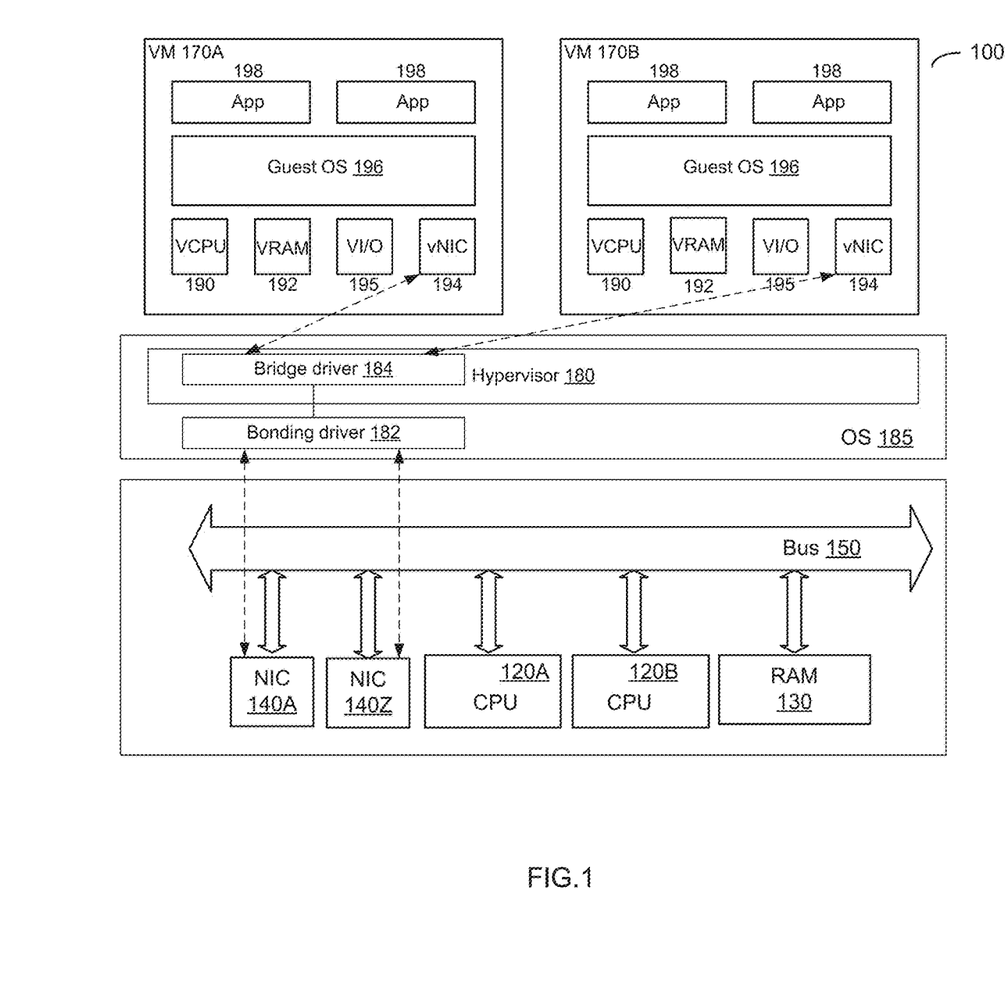
FIG. 1 depicts a high-level component diagram of an example computer system operating in accordance with one or more aspects of the present disclosure.

FIG. 1 depicts a high-level component diagram of an examples computer system operating in accordance with one or more aspects of the present disclosure. Example computer system 100 may comprise one or more processors 120A-120B communicatively coupled to one or more memory devices 130 and two or more NICs 140A-140B via a system bus 150.

"Processor" or "processing device" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

In various implementations, computer system 100 may further comprise various other devices, such as peripheral device controllers, which are omitted from FIG. 1 for clarity and conciseness.

Computer system 100 may be employed as a host system configured to run multiple virtual machines 170, by executing a software layer 180, often referred to as "hypervisor," above the hardware and below the virtual machines. In one illustrative example, hypervisor 180 may be a component of an operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170 as virtual devices.

Virtual machine 170 may comprise one or more virtual processors 190. Processor virtualization may be implemented by hypervisor 180 scheduling time slots on one or more physical processors 120 such that from the guest operating system's perspective those time slots are scheduled on virtual processor 190. Virtual machine 170 may execute guest operating system 196 which may utilize the underlying virtual devices, including virtual memory 192, virtual I/O devices 195, and vNICs 194. One or more applications 198 may be running on virtual machine 170 under guest operating system 196.

In certain implementations, computer system 100 may include a bonding driver 182 configured to aggregate two or more host NICs 140A-140Z into a bonded interface 220 acting as a data link layer logical network interface that may be employed by various applications being executed by computer system 100. "Driver" herein refers to an executable code module that provides a software interface to one or more physical or logical devices, thus enabling the operating systems and application programs to access the underlying device functions. In an illustrative example, bonding driver 182 may be implemented by an executable code module (e.g., a kernel loadable module or a user space module) executed by operating system 185.

Figure 2:
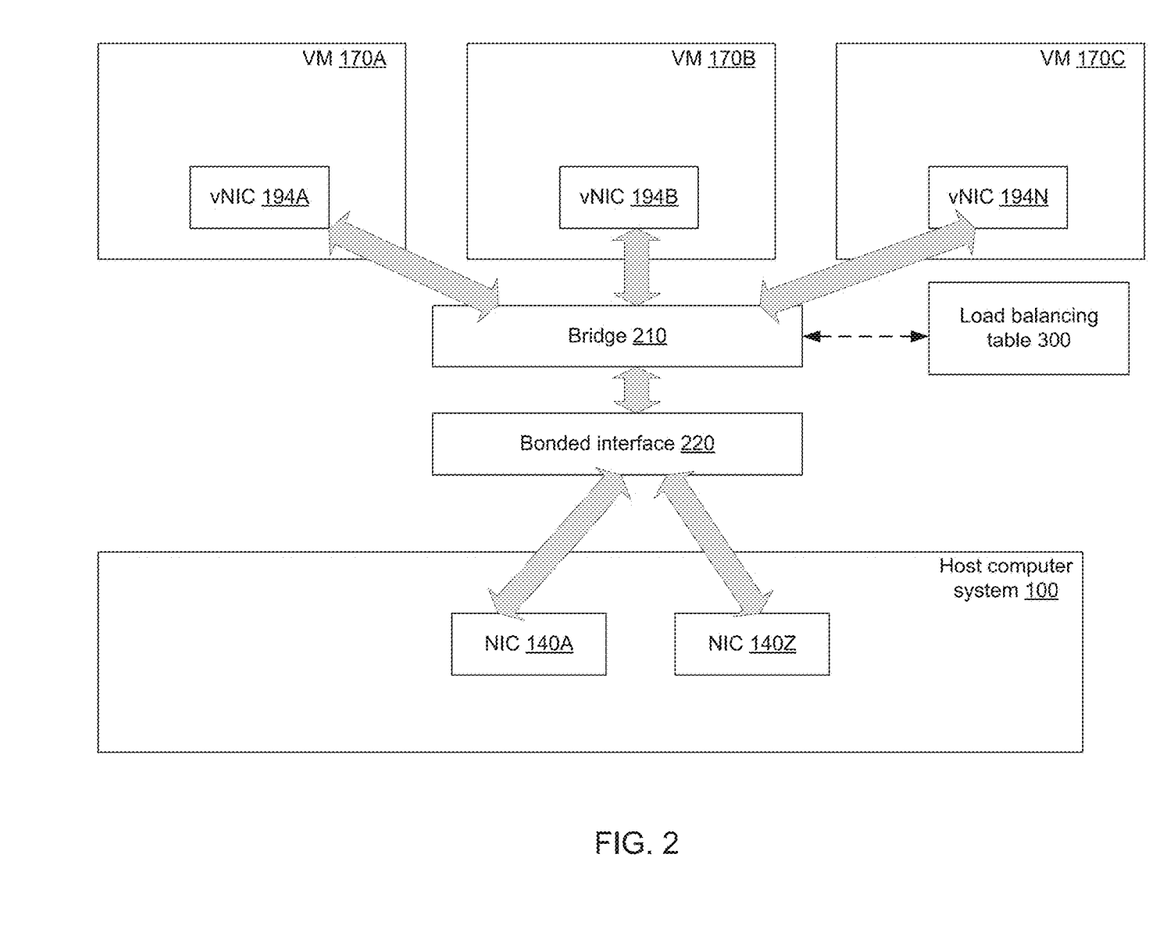
FIG. 2 schematically illustrates an example networking configuration implemented by a host computer system, in accordance with one or more aspects of the present disclosure.

FIG. 2 schematically illustrates an example networking configuration implemented by host computer system 100, in accordance with one or more aspects of the present disclosure. As schematically illustrated by FIG. 2, each virtual machine 170 may comprise a vNIC 194. Host computer system 100 may implement a data link layer bridge 210 to forward data link layer frames between the bridged vNICs 194A-194N and bonded interface 220 aggregating two or more NICs 140A-140Z into a single data link layer logical interface. In certain implementations, bridge 210 may be implemented by a bridge driver 184 (e.g., a code module being executed within the context of hypervisor 180).

In an illustrative example, each of two or more host NICs 140A-140Z may be connected to a corresponding switch port of the same data link layer switch (not shown in FIG. 2), thus increasing the overall throughput of bonded interface 220. In another illustrative example, two or more NICs 140A-140Z may be connected to switch ports of two or more data link layer switches, thus increasing both the overall throughput and reliability of bonded interface 220, as bonded interface 220 would still be fully functional even in the event of a failure of one or more data link layer switches to which NICs 140A-140Z are connected.

Virtual machine 170 may transmit outgoing data link layer frames (e.g., Ethernet frames) via a vNIC 194. Responsive to determining that a data link layer frame transmitted by a virtual machine 170 is addressed to another virtual machine connected to the same data link layer bridge 210, bridge driver 184 may deliver the data link layer frame to the destination vNIC. Otherwise, if the data link layer frame transmitted by a virtual machine 170 is addressed to a recipient residing outside of host computer system 100 bridge driver 184 may deliver the outgoing data link layer frame to bonded interface 220.

Bonding driver 182 may perform selection of egress NICs for outgoing frame transmission by looking up the source MAC address of the outgoing frame in load balancing table 300, the structure of which is described in more details herein below with reference to FIG. 3. Responsive to selecting an egress NIC, bonding driver 182 may transmit the outgoing frame via the selected NIC.

Figure 3:
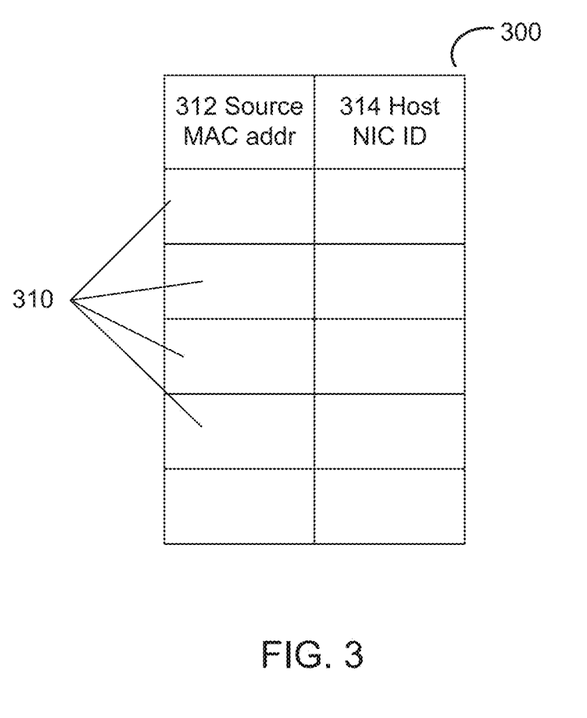
FIG. 3 schematically illustrates an example structure of a load balancing table that may be employed by a bonded network interface, in accordance with one or more aspects of the present disclosure.

FIG. 3 schematically illustrates an example structure of a load balancing table that may be employed by a bonded network interface, in accordance with one or more aspects of the present disclosure. Load balancing table 300 may comprise a plurality of load balancing entries 310A-310Z. Each load balancing entry 310 may map a source MAC address 312 to an identifier 314 of a NIC comprised by bonded interface 220.

Referring again to FIG. 2, bonded interface 220 may, in certain implementations, be configured to substitute the source MAC address of the outgoing data link layer frame with a MAC address of the identified egress NIC before transmitting the outgoing data link layer frame. In order to facilitate the delivery of incoming data link layer frames addressed to virtual machines 170, bonded interface 220 may be configured to respond to Address Resolution Protocol (ARP) requests with respect to network layer addresses assigned to the vNICs 194A-194N. Such an ARP response may comprise the MAC address of one of the NICs of the bonded interface. Incoming data link layer frames may thus be addressed to a NIC of the bonded interface and may then be routed by the bonded interface based on the network layer addresses.

Alternatively, bonded interface 220 may be configured to transmit the outgoing data link layer frame without substituting the source MAC address. Host NICs 140 may be configured to receive, in the promiscuous mode, data link layer frames addressed to MAC addresses assigned to one or more vNICs 194A-194N. The received incoming data link layer frames may then be routed by the bonded interface to the destination vNIC 194 based on the MAC addresses.

"Promiscuous mode" herein refers to a mode of NIC operation in which the NIC passes to its driver all received data link layer frames, rather than dropping the data link layer frames that are not addressed to the particular NIC by a broadcast, multicast or unicast address.

In certain implementations, responsive to failing to locate a load balancing entry corresponding to the source MAC address of the outgoing data link layer frame, bonding driver 182 may select an egress NIC 140 of host computer system 100 to be associated with vNIC 194 that has originated the outgoing frame.

In an illustrative example, bonding driver 182 may select the least loaded NIC 140 of host computer system 100. In certain implementations, the least loaded NIC may be defined as the NIC that has transmitted and/or received the least, among all NICs of host computer system 100, number of data link layer frames within a certain period of time (e.g., a rolling time window comprising a certain time period immediately preceding the current time).

In another illustrative example, bonding driver 182 may select a NIC by applying a certain function to the MAC address of the outgoing data link layer frame. In certain implementations, the identifier of a NIC to be associated with vNIC 194 that has originated the outgoing frame may be determined as an identifier (e.g., the MAC address) of vNIC 194 that has originated the outgoing frame taken by modulo of the number of NICs employed by host computer system 100.

Responsive to selecting the NIC to be associated with vNIC 194 that has originated the outgoing frame, bonding driver 182 may append, to load balancing table 300, a load balancing entry mapping the identifier of the selected NIC to the MAC address of the vNIC 194.

In operation, bonding driver 182 may force re-balancing of bonded interface 220 by removing one or more load balancing entries from load balancing table 300. In an illustrative example, bonding driver 182 may remove, from load balancing table 300, one or more load balancing entries periodically, e.g., based on a round-robin rule. In another illustrative example, bonding driver 182 may remove, from load balancing table 300, one or more load balancing entries responsive to determining that the loads on two or more NICs of the bonded interface are unbalanced. In certain implementations, bonding driver 182 may remove a load balancing entry corresponding to the host NIC that is currently handling the maximum load among all NICs of the host computer system. Alternatively, bonding driver 182 may remove load balancing entries corresponding to the host NICs that are currently handling the minimum and the maximum loads among all NICs of the host computer system.

In certain implementations, bonding driver 182 may remove, from the load balancing table, one or more load balancing entries corresponding to a NIC of the bonded interface responsive to determining that the NIC is not in an operational state (e.g., responsive to detecting a hardware failure of the NIC or receiving an unrecoverable error code from the NIC driver).

Removing one or more load balancing entries from load balancing table 300 may initiate the above described procedure of selection of a new host NIC to be associated with a vNIC the entry for which could not be found in load balancing table 300.

Initialization of load balancing table 300 may be performed by bonding driver 182 upon the driver's initialization. In certain implementations, bonding driver 182 may create an empty table and, responsive to failing to locate a load balancing table entry for a particular vNIC, create a new table entry as described in more details herein above. Alternatively, bonding driver 182 may create a plurality of load balancing table as part of the driver initialization sequence, based on certain driver initialization parameters describing the plurality of vNICs to be served by the bonded interface. In an illustrative example, bonding driver 182 may determine the initial mappings for load balancing table 300 using a round-robin rule, i.e., for each vNIC served by bonded interface 200, bonding driver 182 may select the next unassigned host NIC. In another illustrative example, for each vNIC served by bonded interface 200, bonding driver 182 may select a host NIC randomly. In yet another illustrative example, for each vNIC served by bonded interface 200, bonding driver 182 may select a NIC by applying a certain function to the MAC address of the vNIC (e.g., an identifier of the vNIC taken by modulo of the number of NICs employed by host computer system 100). Responsive to associating a host NIC with the vNIC, bonding driver 182 may create a new load balancing entry in load balancing table 300 to reflect the newly created association.

Figure 4:
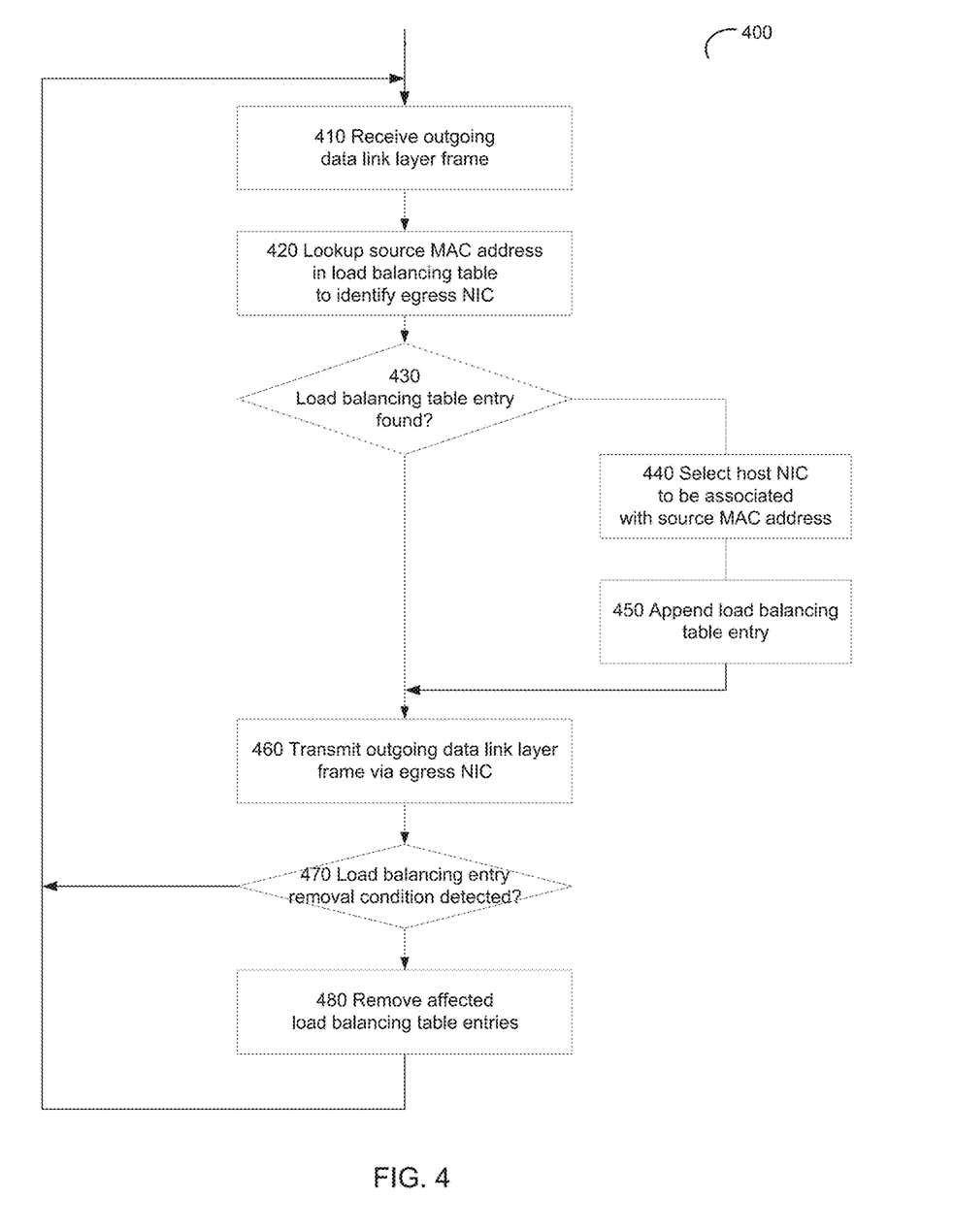
FIG. 4 depicts a flow diagram of an example method 400 for table-based load balancing implemented by bonded network interfaces, in accordance with one or more aspects of the present disclosure.

FIG. 4 depicts a flow diagram of an example method 400 for table-based load balancing implemented by bonded network interfaces, in accordance with one or more aspects of the present disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the bonding driver being executed by the example host computer system may receive an outgoing data link layer frame transmitted by a virtual machine via a data link layer bridge, as described in more details herein above.

At block 420, the bonding driver may look up the source MAC address of the outgoing data link layer frame in a load balancing table that maps MAC addresses of two or more vNICs to identifiers of two or more NICs of the host computer system, as described in more details herein above.

Responsive to determining, at block 430, that a load balancing entry corresponding to the source MAC address of the outgoing data link layer frame has been successfully identified, the processing may continue at block 460; otherwise, the method may branch to block 440.

At block 440, responsive to failing to locate a load balancing entry corresponding to the source MAC address of the outgoing data link layer frame, the bonding driver may select an egress NIC of the host computer system to be associated with the vNIC that has originated the outgoing frame. In an illustrative example, bonding driver 182 may select the least loaded NIC 140 of host computer system 100. In another illustrative example, bonding driver 182 may select a NIC by applying a certain function to the MAC address of the outgoing data link layer frame, as described in more details herein above.

At block 450, the bonding driver may append, to the load balancing table, a load balancing entry mapping the identifier of the selected NIC to the MAC address of the vNIC that has originated the outgoing data link layer frame.

At block 460, the bonding driver may transmit the outgoing data link layer frame via the identified egress NIC.

Responsive to determining, at block 470, that one or more load balancing entry removal conditions have been detected, the processing may continue at block 480; otherwise the method may loop back to block 410.

In an illustrative example, the load balancing entry removal condition may require removing, from the load balancing table, one or more load balancing entries periodically, e.g., based on a round-robin rule. In another illustrative example, the load balancing entry removal condition may require removing, from the load balancing table, one or more load balancing entries responsive to determining that the loads on two or more NICs of the bonded interface are unbalanced. In yet another illustrative example, the load balancing entry removal condition may require removing, from the load balancing table, one or more load balancing entries corresponding to a NIC of the bonded interface responsive to determining that the NIC is not in an operational state (e.g., responsive to detecting a hardware failure of the NIC or receiving an unrecoverable error code from the NIC driver), as described in more details herein above.

At block 460, the bonding driver may remove one or more affected load balancing table entries. Responsive to completing operations described with reference to block 460, the method may loop back to block 410.

Figure 5:
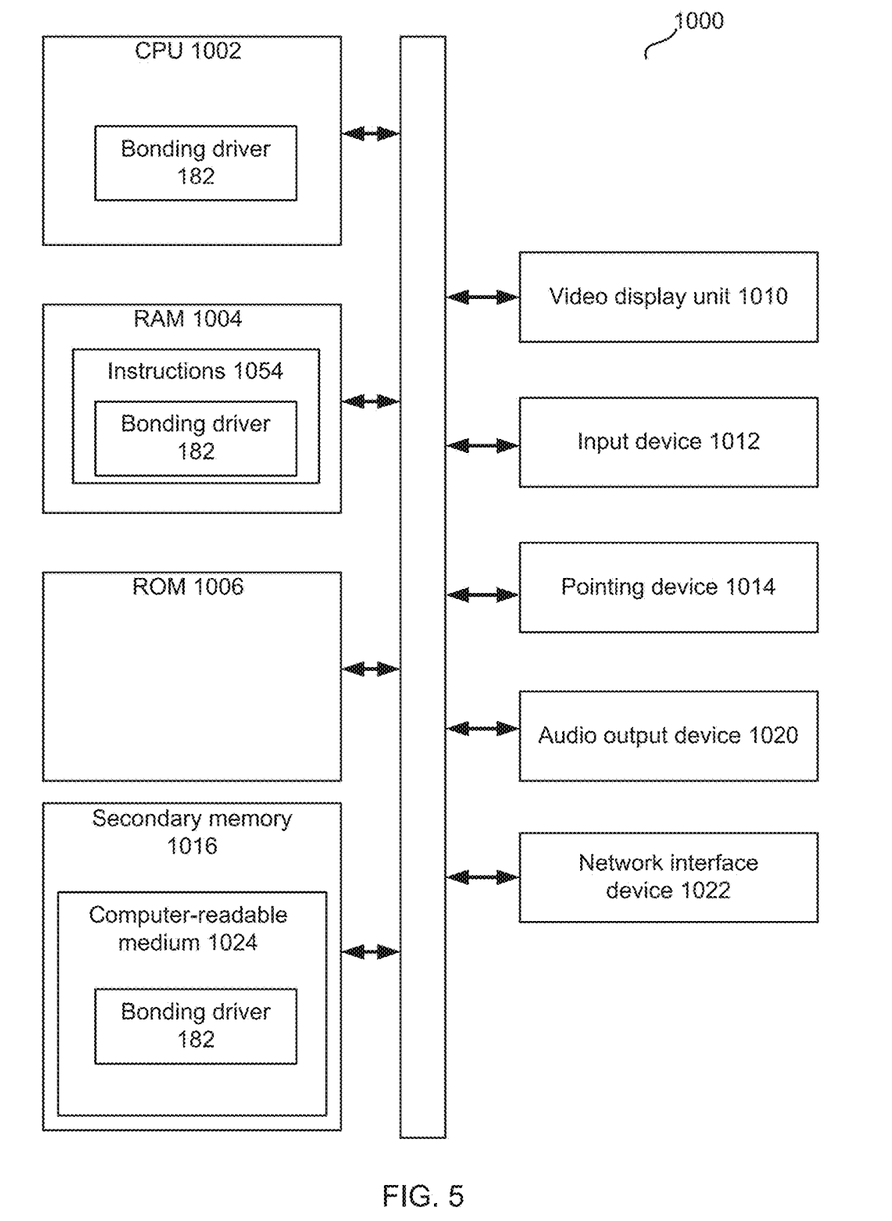
FIG. 5 depicts a block diagram of an illustrative computer system operating in accordance with examples of the invention.

FIG. 5 depicts an example computer system 1000 which can perform any one or more of the methods described herein. In an illustrative example, computer system 1000 may correspond to host computer system 100 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface controller 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding bonding driver 182 of FIG. 1 implementing method 400 for table-based load balancing implemented by bonded network interfaces.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
    implementing, by a hypervisor of a host computer system, a data link layer bridge interface to aggregate traffic from a plurality of virtual network interface controllers (NICs) associated with a plurality of virtual machines running on the host computer system;
    determining, by the data link layer bridge interface, that a data link layer frame transmitted by a virtual machine of the plurality of virtual machines is addressed to a recipient residing outside of the host computer system;
    transmitting, by the data link layer bridge interface, the data link layer frame to a bonded interface aggregating a plurality of NICs into a single data link layer logical interface;
    identifying, by a processing device implementing the bonded interface, a NIC of the bonded interface associated, by a load balancing table, with a source Media Access Control (MAC) address of the data link layer frame, wherein the load balancing table comprises a plurality of load balancing entries, each load balancing entry mapping a source MAC address to an identifier of a NIC comprised by the bonded interface;
    transmitting the data link layer frame via the identified NIC;
    receiving an address resolution protocol (ARP) request; and
    periodically removing from the load balancing table a load balancing entry identifying a NIC that is handling a maximum load among a plurality of loads handled by the plurality of NICs.

2. The method of claim 1, further comprising:
    responsive to failing to locate a load balancing entry corresponding to the source MAC address of the data link layer frame, selecting a NIC of the bonded interface to be associated with the source MAC address of the data link layer frame.

3. The method of claim 2, further comprising:
    appending, to the load balancing table, a load balancing entry associating the selected NIC with the source MAC address of the data link layer frame.

4. The method of claim 2, wherein selecting a NIC to be associated with the source MAC address comprises identifying a least loaded NIC of the bonded interface.

5. The method of claim 2, wherein selecting a NIC to be associated with the source MAC address comprises determining an identifier of the NIC based on the source MAC address.

6. The method of claim 1, further comprising:
    removing one or more load balancing entries from the load balancing table responsive to determining that loads on two or more NICs of the bonded interface are unbalanced.

7. The method of claim 1, further comprising:
    removing, from the load balancing table, one or more load balancing entries corresponding to a NIC of the bonded interface responsive to determining that the NIC is not in an operational state.

8. The method of claim 1, wherein transmitting the data link layer frame further comprises:
    substituting a source MAC address of the data link layer frame with a MAC address of the identified NIC.

9. The method of claim 1, wherein transmitting the data link layer frame via the identified NIC is performed without substituting a source MAC address of the data link layer frame.

10. A computer system comprising:
    a memory; and
    a processing device, operatively coupled to the memory, to:
        implement, by a hypervisor of running on the computer system, a data link layer bridge interface to aggregate traffic from a plurality of virtual network interface controllers (NICs) associated with a plurality of virtual machines running on the computer system;
        determine, by the data link layer bridge interface, that a data link layer frame transmitted by a virtual machine of the plurality of virtual machines is addressed to a recipient residing outside of the computer system;
        transmit, by the data link layer bridge interface, the data link layer frame to a bonded interface aggregating a plurality of NICs into a single data link layer logical interface;
        identify a NIC of the bonded interface associated, by a load balancing table, with a source Media Access Control (MAC) address of the data link layer frame, wherein the load balancing table comprises a plurality of load balancing entries, each load balancing entry mapping a source MAC address to an identifier of a NIC comprised by the bonded interface;
        transmit the data link layer frame via the identified NIC; and
        periodically remove from the load balancing table a load balancing entry identifying a NIC that is handling a maximum load among a plurality of loads handled by the plurality of NICs.

11. The system of claim 10, wherein the processing device is further to:
    responsive to failing to locate a load balancing entry corresponding to the source MAC address of the data link layer frame, select a NIC of the bonded interface to be associated with the source MAC address of the data link layer frame.

12. The system of claim 11, wherein the processing device is further to:
    append, to the load balancing table, a load balancing entry associating the selected NIC with the source MAC address of the data link layer frame.

13. The system of claim 11, wherein to select the NIC to be associated with the source MAC address, the processing device is further to identify a least loaded NIC of the bonded interface.

14. The system of claim 13, wherein to select the NIC to be associated with the source MAC address, the processing device is further to determine an identifier of the NIC based on the source MAC address.

15. A computer-readable non-transitory storage medium comprising executable instructions that, when executed by a processing device, cause the processing device to:
    implement, by a hypervisor of running on a host computer system, a data link layer bridge interface to aggregate traffic from a plurality of virtual network interface controllers (NICs) associated with a plurality of virtual machines running on the host computer system;
    determine, by the data link layer bridge interface, that a data link layer frame transmitted by a virtual machine of the plurality of virtual machines is addressed to a recipient residing outside of the host computer system;

transmit, by the data link layer bridge interface, the data link layer frame to a bonded interface aggregating a plurality of NICs into a single data link layer logical interface;

identify, by the processing device, a NIC of the bonded interface associated, by a load balancing table, with a source Media Access Control (MAC) address of the data link layer frame, wherein the load balancing table comprises a plurality of load balancing entries, each load balancing entry mapping a source MAC address to an identifier of a NIC comprised by the bonded interface;

transmit the data link layer frame via the identified NIC; and periodically remove from the load balancing table a load balancing entry identifying a NIC that is handling a maximum load among a plurality of loads handled by the plurality of NICs.

16. The computer-readable non-transitory storage medium of claim 15, further comprising executable instructions causing the processing device to:

responsive to failing to locate a load balancing entry corresponding to the source MAC address of the data link layer frame, select a NIC of the bonded interface to be associated with the source MAC address of the data link layer frame.

17. The computer-readable non-transitory storage medium of claim 15, further comprising executable instructions causing the processing device to:

append, to the load balancing table, a load balancing entry associating the selected NIC with the source MAC address of the data link layer frame.

* * * * *